US012615215B2

(12) United States Patent
Jeon

(10) Patent No.: US 12,615,215 B2
(45) Date of Patent: Apr. 28, 2026

(54) COMMUNICATION SYSTEM AND METHOD

(71) Applicant: LG Energy Solution, Ltd., Seoul (KR)

(72) Inventor: Young-Hwan Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 426 days.

(21) Appl. No.: 17/772,193

(22) PCT Filed: Jul. 7, 2021

(86) PCT No.: PCT/KR2021/008666
§ 371 (c)(1),
(2) Date: Apr. 27, 2022

(87) PCT Pub. No.: WO2022/010264
PCT Pub. Date: Jan. 13, 2022

(65) Prior Publication Data
US 2022/0407812 A1 Dec. 22, 2022

(30) Foreign Application Priority Data

Jul. 9, 2020 (KR) ........................ 10-2020-0084903

(51) Int. Cl.
H04L 47/36 (2022.01)
B60L 58/12 (2019.01)
(Continued)

(52) U.S. Cl.
CPC .............. H04L 47/36 (2013.01); B60L 58/12 (2019.02); B60L 58/16 (2019.02); H04L 12/40 (2013.01);
(Continued)

(58) Field of Classification Search
CPC ......... H04L 47/36; H04L 12/40; H04L 47/30; B60L 58/12; B60L 58/16
See application file for complete search history.

(56) References Cited

U.S. PATENT DOCUMENTS 6,266,778 B1 * 7/2001 Bell ..................... G06F 13/4226
713/400
9,397,788 B1 * 7/2016 Cai ..................... H04L 65/1069
(Continued)

FOREIGN PATENT DOCUMENTS

CN 101809597 A 8/2010
CN 103562900 A 2/2014
(Continued)

OTHER PUBLICATIONS

Extended European Search Report including Written Opinion for Application No. 21838428.7 dated Nov. 25, 2022, pp. 1-7.
(Continued)

*Primary Examiner* — Kevin M Cunningham
(74) *Attorney, Agent, or Firm* — Lerner David LLP

(57) ABSTRACT
A communication system and method that may reduce the communication load and reduce the waste of system resources consumed for communication. Since a communication packet is generated using a packet structure most suitable for the data size and communication is performed through the generated communication packet, there is an advantage in that the communication load on the communication bus may be significantly reduced. In addition, since the information requesting device allocates a buffer corresponding to the communication packet and stores the communication packet in the allocated buffer, there is an advantage in that the buffer of the information requesting device may be prevented from being wasted.

16 Claims, 3 Drawing Sheets

(51) Int. Cl.
B60L 58/16 (2019.01)
H04L 12/40 (2006.01)
H04L 47/30 (2022.01)

(52) U.S. Cl.
CPC ........ *H04L 12/40071* (2013.01); *H04L 47/30* (2013.01); *B60L 2240/545* (2013.01); *B60L 2240/547* (2013.01); *B60L 2240/549* (2013.01)

(56) References Cited

U.S. PATENT DOCUMENTS

| 2001/0053157 | A1* | 12/2001 | Li ........................... H04L 45/00 370/466 |
| 2003/0163619 | A1 | 8/2003 | Saito |
| 2005/0105532 | A1 | 5/2005 | Yun et al. |
| 2008/0192765 | A1 | 8/2008 | Oh et al. |
| 2009/0092147 | A1* | 4/2009 | Arita ....................... H04L 47/30 370/431 |
| 2010/0195538 | A1 | 8/2010 | Merkey et al. |
| 2010/0214936 | A1 | 8/2010 | Ito et al. |
| 2011/0235535 | A1 | 9/2011 | Furukawa |
| 2012/0140281 | A1* | 6/2012 | Matsuo ................. H04L 69/161 358/1.15 |
| 2013/0051225 | A1 | 2/2013 | Pullen |
| 2013/0057390 | A1* | 3/2013 | Watt ................... G06K 19/0717 235/492 |
| 2014/0129900 | A1 | 5/2014 | Hartwich |
| 2014/0245102 | A1 | 8/2014 | Hartwich |
| 2015/0373158 | A1 | 12/2015 | Kim |
| 2015/0373673 | A1* | 12/2015 | Lyu ..................... H04L 27/2666 370/329 |
| 2016/0121816 | A1 | 5/2016 | Koo |
| 2016/0285775 | A1 | 9/2016 | Damnjanovic et al. |
| 2016/0344703 | A1* | 11/2016 | Sharma ................. G06F 21/602 |
| 2020/0145880 | A1 | 5/2020 | Kubo et al. |

FOREIGN PATENT DOCUMENTS

| CN | 105282209 | A | 1/2016 |
| CN | 106200567 | A | 12/2016 |
| JP | H5103016 | A | 4/1993 |
| JP | 5218462 | B2 | 6/2013 |
| JP | 5499346 | B2 | 5/2014 |
| JP | 2017188793 | A | 10/2017 |
| JP | 2019033452 | A | 2/2019 |
| KR | 20020066283 | A | 8/2002 |
| KR | 20050046089 | A | 5/2005 |
| KR | 100556748 | B1 | 3/2006 |
| KR | 100875739 | B1 | 12/2008 |
| KR | 101204152 | B1 | 11/2012 |
| KR | 20130025813 | A | 3/2013 |
| KR | 101573637 | B1 | 12/2015 |
| KR | 20190046477 | A | 5/2019 |
| WO | 2013085091 | A1 | 6/2013 |

OTHER PUBLICATIONS

International Search Report for Application No. PCT/KR2021/008666 mailed Oct. 25, 2021, pp. 1-3.
Search Report dated Feb. 8, 2023 from the Office Action for Chinese Application No. 202180005396.7 issued Feb. 11, 2023, 3 pages [See p. 1-2, categorizing the cited references].

* cited by examiner

< FIRST PACKET STRUCTURE >

< SECOND PACKET STRUCTURE >

< SECOND PACKET STRUCTURE >

COMMUNICATION SYSTEM AND METHOD

CROSS-REFERENCE TO RELATED APPLICATIONS

The present application is a national phase entry under 35 U.S.C. § 371 of International Application No. PCT/KR2021/008666 filed Jul. 7, 2021, published in Korean, which claims priority from Korean Patent Application No. 10-2020-0084903 filed Jul. 9, 2020, all of which are incorporated herein by reference.

TECHNICAL FIELD

The present disclosure relates to a communication system and method, and more specifically, to a communication system and method that may reduce the communication load and reduce the waste of system resources consumed for communication.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

Meanwhile, various electronic control units (ECUs) are included in a device equipped with such a battery, and the ECUs communicate with each other to provide information or receive information from other ECUs. Taking a vehicle as an example, various functions and controls increase in the vehicle, and in particular, as an electric vehicle equipped with a battery is put to practical use, the amount of data transmission and reception between ECUs is increasing. Accordingly, communication standards and technologies for improving the efficiency of data communication between ECUs have been proposed.

For example, Patent Literature 1 discloses only a configuration in which a data receiving side changes a reception mode to a high speed mode or a normal mode using CAN (Controller Area Network) communication. However, Patent Literature 1 has a problem in that it is difficult to apply to a device such as an electric vehicle in which various information must be provided in real time because the traffic load is improved by changing the reception mode.

That is, in Patent Literature 1, the transmitting side must transmit single information through each communication packet. Accordingly, when Patent Literature 1 is used, a problem that a considerable amount of time may be required in a situation in which diagnostic data must be rapidly generated and transmitted and various ECU states need to be diagnosed using such diagnostic data may arise. In addition, since Patent Literature 1 uses only a communication packet including a single information, a problem in that a communication load is increased when a plurality of information is transmitted may occur.

(Patent Literature 1) KR 10-1573637 B1

SUMMARY

Technical Problem

The present disclosure is designed to solve the problems of the related art, and therefore the present disclosure is directed to providing a communication system and method that may reduce the communication load and reduce the waste of system resources consumed for communication.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A communication system comprising: a first device; and a second device communicatively connected to the first device using a communication bus, wherein the first device is configured to receive an information provision request including at least one data identification information from the second device, select one of a plurality of packet structures according to a data size of at least one response data corresponding to the data identification information, generate a communication packet including packet information and the response data using the selected packet structure, and output the generated communication packet to the communication bus, and wherein the second device is configured to receive the communication packet from the communication bus, determine whether or not to store the communication packet based on the packet information included in the communication packet, and in response to a determination to store the communication packet, allocate a buffer corresponding to the communication packet based on the packet information, store the response data included in the communication packet in the allocated buffer, and extract the response data from the buffer.

The packet information may be configured to include at least one of packet identification information, packet structure information and data size information.

The second device may be configured to determine whether or not to store the communication packet based on the packet identification information included in the communication packet.

The second device may be configured to allocate a buffer corresponding to the communication packet based on at least one of the packet structure information and the data size information.

The first device may include: a control unit configured to calculate the data size of the at least one response data, compare the calculated data size with a preset reference value, select either one of a first packet structure or a second packet structure based on the comparison result, and generate the communication packet based on the selected packet structure; a transmission buffer configured to store the communication packet generated by the control unit; and a packet transmitter configured to output the communication packet stored in the transmission buffer to the communication bus.

The first device may further include a sensor connected to at least one battery and configured to measure battery information including at least one of voltage, current and temperature of the connected battery.

The control unit may be configured to receive the battery information from the sensor and generate the at least one response data corresponding to the data identification information based on the received battery information.

The control unit may be configured to select the first packet structure in response to the calculated data size being equal to or less than the preset reference value.

The control unit may be configured to select the second packet structure in response to the calculated data size exceeding the preset reference value.

The control unit may be configured to generate the packet identification information to correspond to the data identification information of the information provision request, generate the packet structure information to correspond to the selected packet structure, generate the data size information to correspond to the calculated data size, and store the packet identification information, the packet structure information and the data size information in a predetermined region of the selected packet structure.

The second device may include: a reception buffer in which the response data included in the communication packet is stored; a packet receiver configured to receive the communication packet through the communication bus, extract the packet identification information from the received communication packet, store the response data included in the communication packet in the reception buffer in response to the extracted packet identification information corresponding to the information provision request, and extract the response data from the reception buffer; and a processor configured to receive the extracted response data from the packet receiver.

The packet receiver may be configured to extract the packet structure information from the communication packet, determine the selected packet structure of the communication packet based on the extracted packet structure information, and allocate the reception buffer in a size preset to correspond to the determined packet structure.

The packet receiver may be configured to further extract the data size information from the communication packet in response to the determined packet structure being the second packet structure, and adjust the size of the allocated buffer to correspond to the data size of the response data based on the extracted data size information.

The packet receiver may be configured to store the response data included in the communication packet in the buffer after adjustment of the size of the allocated buffer to correspond to the data size of the response data and transmit the response data extracted from the reception buffer to the processor.

The first device may be configured to generate a plurality of communication packets based on at least one packet structure among the plurality of packet structures according to the data size of the response data.

An electric vehicle according to another aspect of the present disclosure may comprise the communication system according to any of the embodiments described in the present disclosure.

A communication method according to still another aspect of the present disclosure may comprise: receiving, by first device, an information provision request including at least one data identification information; selecting, by the first device, one of a plurality of packet structures according to a data size of at least one response data corresponding to the data identification information; generating, by the first device, a communication packet including packet information and the response data by using the selected packet structure; outputting, by the first device, the generated communication packet to a communication bus; receiving, by a second device, the communication packet through the communication bus; determining, by the second device, whether or not to store the communication packet based on the packet information included in the communication packet; in response to determining to store the communication packet, allocating, by the second device, a buffer corresponding to the communication packet based on the packet information; storing, by the second device, the response data included in the communication packet in the allocated buffer; and extracting, by the second device, the response data from the buffer.

A first device according to still another aspect of the present disclosure may comprise: a processor configured to: transmit an information provision request to a second device over a communication bus, the information provision request including at least one data identification information from the first device, the data identification information corresponding to a data size; in response to transmission of the information provision request, receive a communication packet from the second device over the communication bus, the communication packet including packet information and response data, the response data having the data size corresponding to the data identification information of the information provision request; determine whether or not to store the communication packet based on the packet information included in the communication packet; in response to a determination to store the communication packet: allocate a buffer corresponding to the communication packet based on the packet information; store the response data included in the communication packet in the allocated buffer; and extract the response data from the buffer

Advantageous Effects

According to one aspect of the present disclosure, since a communication packet is generated using a packet structure most suitable for the data size and communication is performed through the generated communication packet, there is an advantage in that the communication load on the communication bus may be significantly reduced.

In addition, according to another aspect of the present disclosure, since the information requesting device allocates a buffer corresponding to the communication packet and stores the communication packet in the allocated buffer, there is an advantage in that the buffer of the information requesting device may be prevented from being wasted.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
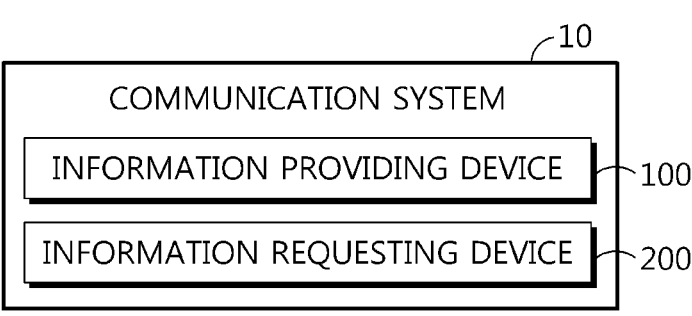
FIG. 1 is a diagram schematically showing a communication system according to an embodiment of the present disclosure.
Figure 2:
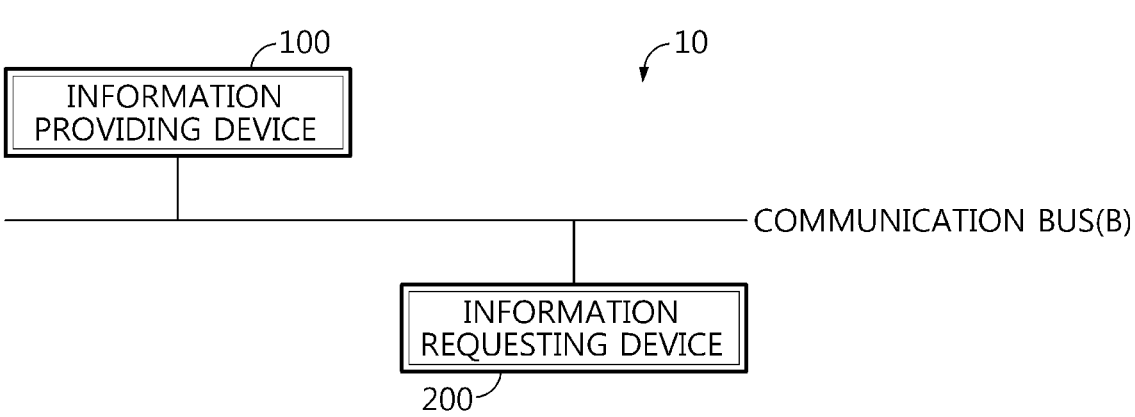
FIG. 2 is a diagram schematically showing an exemplary configuration of the communication system according to an embodiment of the present disclosure.

FIG. 1 is a diagram schematically showing a communication system 10 according to an embodiment of the present disclosure. FIG. 2 is a diagram schematically showing an exemplary configuration of the communication system 10 according to an embodiment of the present disclosure.

Referring to FIGS. 1 and 2, the communication system 10 according to an embodiment of the present disclosure may include an information providing device 100 and an information requesting device 200.

Referring to FIG. 2, the information providing device 100 and the information requesting device 200 may be connected to communicate with each other by using a communication bus B.

The information providing device 100 may be configured to receive an information provision request including at least one data identification information from the information requesting device 200.

Specifically, the information requesting device 200 may output an information provision request including at least one data identification information to the communication bus B. In addition, the information providing device 100 may receive the information provision request through the communication bus B.

Here, the data identification information may be information on an item of data requested by the information requesting device 200. For example, the data identification information that may be included in the information provision request may include battery-related items about battery information such as voltage, current, temperature, state of charge (SOC), and state of health (SOH) of the battery. In addition, the data identification information may include items related to diagnosis such as a diagnosis code for a battery and a diagnosis code for an electronic control unit (ECU).

Here, the battery may mean one independent cell that includes a negative electrode terminal and a positive electrode terminal and is physically separable. For example, one pouch-type lithium polymer cell may be regarded as a battery cell. Also, the battery may refer to a battery pack in which one or more battery cells are connected in series and/or in parallel, and further includes an electrical device (a relay, a fuse, etc.) and a case.

In addition, the electronic control unit may include an ACU (Airbag Control Unit), a BCM (Body Control Module), an ECU (Engine Control Unit), a PCM (Powertrain Control Module), a TCU (Transmission Control Unit), an ABS (Anti-lock Braking System), an ESC (Electronic Stability Control), a HPCU (Hybrid Power Control Unit), a BMS (Battery Management System), and a MCU (Motor Control Unit).

For example, in the embodiment of FIG. 2, the information providing device 100 and the information requesting device 200 may be connected in parallel using the communication bus B. That is, the information provision request output to the communication bus B by the information requesting device 200 may be received by the information providing device 100.

Also, the information providing device 100 may be configured to select at least one of a plurality of packet structures according to a data size of at least one response data corresponding to the data identification information.

Specifically, the information providing device 100 may extract data identification information from the received information provision request. For example, when the information requesting device 200 intends to request voltage information of a battery pack to the information providing device 100, the information requesting device 200 may output an information provision request including data identification information about the voltage of the battery pack to the communication bus B. In addition, the information providing device 100 may receive the information provision request and extract data identification information about the voltage of the battery pack from the received information provision request.

The information providing device 100 may generate response data corresponding to the data identification information. That is, the response data may be data corresponding to the data identification information requested by the information requesting device 200. In addition, the information providing device 100 may select a packet structure for generating a communication packet according to the data size of the generated response data. Preferably, each of the plurality of packet structures may be preset to correspond to a data size of the response data.

Also, the information providing device 100 may be configured to generate a communication packet including packet information and the response data by using the selected packet structure.

Here, the packet information may be configured to include at least one of packet identification information, packet structure information, and data size information. Preferably, the packet information may include all of the packet identification information, the packet structure information, and the data size information.

Specifically, the information providing device 100 may generate a communication packet to be provided to the information requesting device 200 by storing the packet information and the response data in the selected packet structure.

Here, the packet identification information may be identification information corresponding to the information provision request. That is, the packet identification information may be identification information through which the information requesting device 200 may determine whether the communication packet generated by the information providing device 100 is a communication packet corresponding to the information provision request.

In addition, the packet structure information may be identification information about the packet structure selected by the information providing device 100 according to the data size of the response data among the plurality of packet structures. That is, the packet structure information may be identification information through which the information requesting device 200 may identify the packet structure that is the basis of the communication packet generated by the information providing device 100.

In addition, the data size information may be information about the data size of the response data. For example, the data size information may be a data length code (DLC). That is, the data size information may be information through which the information requesting device 200 may identify the data size of the response data included in the communication packet.

In addition, the information providing device 100 may be configured to output the generated communication packet to the communication bus B.

For example, in the embodiment of FIG. 2, the information providing device 100 may output the generated communication packet to the communication bus B connected to the information requesting device 200.

The information requesting device 200 may be configured to receive the communication packet output to the communication bus B by the information providing device 100.

For example, in the embodiment of FIG. 2, the information requesting device 200 may be connected to the communication bus B. In addition, the information requesting device 200 may receive the communication packet output to the communication bus B by the information providing device 100.

Preferably, the information requesting device 200 may first check the packet information included in the communication packet. In addition, the information requesting device 200 may store the response data included in the communication packet if the packet information satisfies a predetermined condition.

Also, the information requesting device 200 may be configured to determine whether or not to store the communication packet based on the packet information included in the communication packet.

Preferably, the information requesting device 200 may be configured to determine whether or not to store the communication packet based on the packet identification information included in the communication packet.

Specifically, the packet identification information may be identification information capable of checking whether the communication packet received by the information requesting device 200 is a communication packet corresponding to the information provision request. Accordingly, the information requesting device 200 may check the packet identification information stored in the communication packet. In addition, the information requesting device 200 may determine to store the communication packet only when the packet identification information corresponds to the information provision request transmitted to the information providing device 100. Preferably, the information requesting device 200 may determine to store the response data included in the communication packet.

Also, if it is determined to store the communication packet, the information requesting device 200 may be configured to allocate a buffer corresponding to the communication packet based on the packet information.

Specifically, the information requesting device 200 may be configured to allocate a buffer corresponding to the communication packet based on at least one of the packet structure information and the data size information.

Here, the buffer means a storage area in which communication packets can be stored.

For example, the information requesting device 200 may check the packet structure information stored in the communication packet to identify the packet structure that is the basis of the communication packet. In addition, the information requesting device 200 may allocate a buffer preset to correspond to the checked packet structure. Conversely, if the information requesting device 200 determines not to store the communication packet, the information requesting device 200 may ignore the communication packet without allocating a buffer corresponding to the communication packet.

The information requesting device 200 may be configured to store the response data included in the communication packet in the allocated buffer and extract the response data from the buffer.

Specifically, the information requesting device 200 may store the response data included in the communication packet in the allocated buffer. That is, the communication packet may be received and stored by the information requesting device 200 independently from each other. In addition, the information requesting device 200 may extract the response data stored in the buffer. Here, the response data may be data corresponding to the information provision request transmitted by the information requesting device 200 to the information providing device 100. Accordingly, as the information requesting device 200 extracts the response data from the buffer, the communication between the information requesting device 200 and the information providing device 100 may be terminated.

According to the communication system 10 according to an embodiment of the present disclosure, a communication packet is generated using a packet structure most suitable for the data size of the response data, and communication between the information providing device 100 and the information requesting device 200 is performed through the generated communication packet. Thus, there is an advantage that the communication load on the communication bus B can be significantly reduced.

In addition, according to the communication system 10 according to an embodiment of the present disclosure, since the information requesting device 200 allocates a buffer corresponding to the communication packet and stores the response data included in the communication packet in the allocated buffer, it is possible to prevent the buffer of the information requesting device 200 from being wasted. That is, since the reception buffer of the information requesting device 200 is efficiently managed, there is an advantage that system resources of the information requesting device 200 are not wasted unnecessarily and can be used efficiently.

Figure 3:
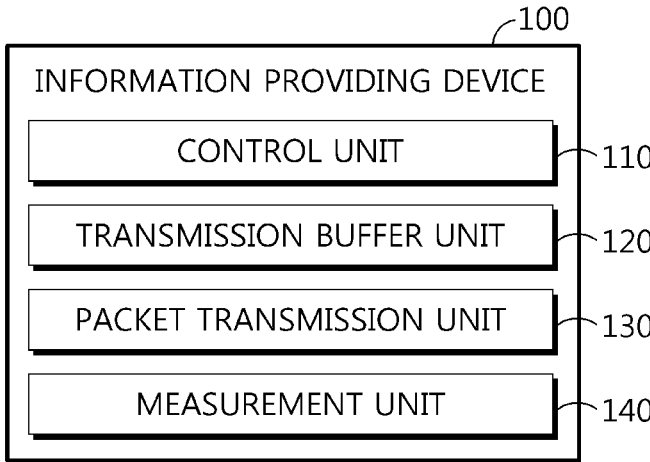
FIG. 3 is a diagram schematically showing an information providing device included in the communication system according to an embodiment of the present disclosure.

FIG. 3 is a diagram schematically showing the information providing device 100 included in the communication system 10 according to an embodiment of the present disclosure.

Referring to FIG. 3, the information providing device 100 may include a control unit 110, a transmission buffer unit 120, and a packet transmission unit 130.

The control unit 110 may be configured to calculate a data size of the at least one response data.

For example, when only one data identification information is included in the information provision request, the control unit 110 may calculate a data size of one response data.

As another example, when a plurality of data identification information are included in the information provision request, the control unit 110 may calculate a data size of each of the plurality of response data, and sums the plurality of calculated data sizes to calculate a total data size for the plurality of response data.

In addition, the control unit 110 may be configured to compare the calculated data size with a preset reference value and select any one of a first packet structure and a second packet structure based on the comparison result.

Specifically, the control unit 110 may be configured to select the first packet structure when the calculated data size is equal to or less than the preset reference value. Conversely, the control unit 110 may be configured to select the second packet structure when the calculated data size exceeds the preset reference value.

For example, the first packet structure may be a packet structure for CAN (Controller Area Network) communication, and the second packet structure may be a packet structure for CAN FD (Controller Area Network Flexible Data-rate) communication. In this case, the preset reference value may be 8 bytes. If the data size of the response data is 8 bytes or less, the control unit 110 may select the first packet structure for CAN communication. Conversely, when the data size of the response data exceeds 8 bytes, the control unit 110 may select the second packet structure for CAN FD communication.

Also, the control unit 110 may be configured to generate the communication packet based on the selected packet structure.

Specifically, the control unit 110 may select any one of the first packet structure and the second packet structure based on the data size and generate a communication packet by storing the packet information and the response data in the selected packet structure.

Preferably, the packet structure may include a packet information region in which information about a packet is stored and a data region in which response data is stored. In addition, in the packet structure, a region in which the packet information is to be stored may be allocated in advance. Accordingly, the control unit 110 may store the packet information in the packet information region first, and then store the response data in the data region.

The transmission buffer unit 120 may be configured to store the communication packet generated by the control unit 110.

Specifically, the transmission buffer unit 120 may store the communication packet before the communication packet is output to the communication bus B. Preferably, the control unit 110 may store the generated communication packet in the transmission buffer unit 120.

The packet transmission unit 130 may be configured to output the communication packet stored in the transmission buffer unit 120 to the communication bus B.

Specifically, the packet transmission unit 130 may output the communication packet stored in the transmission buffer unit 120 to the communication bus B. That is, when the communication packet is stored in the transmission buffer unit 120 by the control unit 110, the packet transmission unit 130 may output the communication packet stored in the transmission buffer unit 120 to the communication bus B.

Referring to FIG. 3, the information providing device 100 may further include a measurement unit 140.

The measurement unit 140 may be configured to be connected to at least one battery.

In addition, the measurement unit 140 may be configured to measure battery information including at least one of voltage, current and temperature of the connected battery.

For example, the measurement unit 140 may include a voltage measurement unit that measures a positive electrode voltage and a negative electrode voltage of a battery, and calculates a difference between the measured positive electrode voltage and the measured negative electrode voltage to obtain a voltage value of the battery. In addition, the measurement unit 140 may include a current measurement unit that may measure a current value of the battery on a charging and/or discharging path of the battery. In addition, the measurement unit 140 may include a temperature measurement unit that may measure the temperature of the battery.

Also, the measurement unit 140 may be configured to be connected to the control unit 110.

The control unit 110 may be configured to receive the battery information from the measurement unit 140.

Specifically, the control unit 110 may extract the data identification information included in the information provision request and request battery information from the measurement unit 140 to obtain response data corresponding to the extracted data identification information.

For example, when the data identification information included in the information provision request is an item for battery voltage, the control unit 110 may request the measurement unit 140 to measure the voltage of the battery in order to obtain response data for the battery voltage value. The measurement unit 140 may measure the voltage value of the battery and transmit the measured voltage value of the battery to the control unit 110.

Also, the control unit 110 may be configured to generate the at least one response data corresponding to the data identification information based on the received battery information.

For example, in the above embodiment, the control unit 110 may receive the voltage value of the battery from the measurement unit 140 and generate response data based on the received voltage value of the battery. For example, when the voltage value of the battery measured by the measurement unit 140 is 10 [V], the control unit 110 receives a value of 10 [V] as the voltage value of the battery from the measurement unit 140, and generate a value for the received 10 [V] as the response data.

As another example, when the data identification information included in the information provision request is a voltage-related diagnosis item for the battery, the control unit 110 may receive the voltage value of the battery from the measurement unit 140. In addition, the control unit 110 may diagnose the state of the battery based on the voltage of the battery. For example, the control unit 110 may diagnose the state of the battery by comparing the voltage value of the battery received from the measurement unit 140 with a preset reference voltage value. In addition, the control unit 110 may generate a diagnosis result as the response data.

In the above, a limited embodiment for the response data that the control unit 110 can generate has been described. However, the response data that the control unit 110 can generate is not limited by this embodiment, and may include various battery information and/or diagnosis information corresponding to the data identification information included in the information provision request.

Meanwhile, the control unit 110 provided to the information providing device 100 and the processor 230 provided to the information requesting device 200 may selectively include processors known in the art, application-specific integrated circuit (ASIC), other chipsets, logic circuits, registers, communication modems, data processing devices, and the like to execute various control logic performed in the present disclosure.

Meanwhile, the information requesting device 200 may be configured to further include a communication unit (not shown) configured to output the information provision request to the communication bus B, and the information providing device 100 may be configured to further include a communication unit (not shown) capable of receiving the information provision request.

For example, the communication unit of the information requesting device 200 may output an information provision request including a data identification item to the communication bus B. In addition, the communication unit of the information providing device 100 may receive the information provision request output to the communication bus B.

The control unit 110 may be configured to generate identification information corresponding to the information provision request as the packet identification information.

Specifically, the control unit 110 may generate identification information through which it is possible to determine whether the communication packet is a communication packet corresponding to the information provision request, as the packet identification information.

Also, the control unit 110 may be configured to generate structure identification information corresponding to the selected packet structure as the packet structure information.

Specifically, the control unit 110 may generate structure identification information indicating a packet structure of the communication packet among a plurality of selectable packet structures as the packet structure information.

Also, the control unit 110 may be configured to generate the data size information based on the calculated data size.

Also, the control unit 110 may be configured to generate the communication packet by storing the packet identification information, the packet structure information and the data size information in a region allocated in advance in the selected packet structure.

Preferably, in the packet structure, a packet information region in which the packet identification information, the packet structure information and the data size information may be stored may be allocated in advance. Accordingly, when generating a communication packet, the control unit 110 may store the generated packet identification information, the generated packet structure information and the generated data size information in the packet information region allocated in advance.

Accordingly, the information requesting device 200 that has received the communication packet may check whether the received communication packet is a communication packet corresponding to the information provision request received through the packet identification information stored in the communication packet. Also, the information requesting device 200 may check the packet structure of the received communication packet through the packet structure information stored in the communication packet. Also, the information requesting device 200 may check the data size of the response data through the data size information stored in the communication packet.

Figure 4:
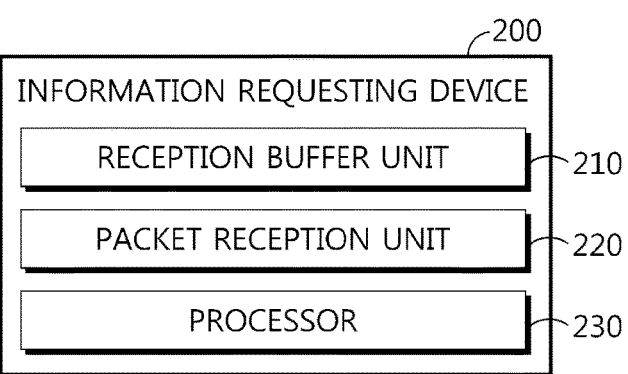
FIG. 4 is a diagram schematically showing an information requesting device included in the communication system according to an embodiment of the present disclosure.

FIG. 4 is a diagram schematically showing the information requesting device 200 included in the communication system 10 according to an embodiment of the present disclosure.

Referring to FIG. 4, the information requesting device 200 may include a reception buffer unit 210, a packet reception unit 220, and a processor 230.

The reception buffer unit 210 may be configured to include a buffer in which the response data included in the communication packet is stored. Preferably, after the packet information stored in the communication packet is checked by the packet reception unit 220, the response data included in the communication packet may be stored in the buffer of the reception buffer unit 210.

The packet reception unit 220 may be configured to receive the communication packet through the communication bus B.

Preferably, the packet reception unit 220 may be connected to the communication bus B. In addition, when the information providing device 100 outputs the communication packet to the communication bus B, the packet reception unit 220 may receive the communication packet through the communication bus B.

Also, the packet reception unit 220 may be configured to extract the packet identification information from the received communication packet.

As described above, the packet identification information may be identification information capable of checking whether the received communication packet is a communication packet corresponding to the information provision request. Accordingly, the packet reception unit 220 may check whether the communication packet received through the communication bus B is a communication packet corresponding to the information provision request transmitted to the information providing device 100 by firstly checking the packet identification information stored in the communication packet before storing the response data in the reception buffer unit 210.

In addition, the packet reception unit 220 may be configured to store the communication packet in the reception buffer unit 210 when the extracted packet identification information corresponds to the information provision request.

Specifically, the packet reception unit 220 may store the response data included in the received communication packet in the reception buffer unit 210 only when the received communication packet is a communication packet corresponding to the information provision request transmitted to the information providing device 100.

For example, when the packet identification information stored in the communication packet does not correspond to the information provision request, the packet reception unit 220 may ignore the received communication packet.

Also, the packet reception unit 220 may be configured to extract the response data from the reception buffer unit 210.

Specifically, the packet reception unit 220 may store the response data in the reception buffer unit 210 and then extract the response data from the reception buffer unit 210.

Even if the packet identification information stored in the communication packet does not correspond to the information provision request, if the packet reception unit 220 stores the response data in the reception buffer unit 210, system resources of the reception buffer unit 210 may be excessively wasted. Accordingly, the packet reception unit 220 may be configured to store the response data in the reception buffer unit 210 only for a communication packet corresponding to the information provision request.

The processor 230 may be configured to receive the response data from the packet reception unit 220.

Specifically, the processor 230 may be connected to communicate with the packet reception unit 220. In addition, the packet reception unit 220 may transmit the response data extracted from the reception buffer unit 210 to the processor 230. That is, the processor 230 may receive the response data corresponding to the information provision request through the packet reception unit 220.

According to an embodiment of the present disclosure, only the response data included in a communication packet corresponding to the information provision request is stored in the reception buffer unit 210, and the stored response data may be extracted. That is, response data included in all communication packets output to the communication bus B is not stored in the information requesting device 200, but only the response data included in the communication packet corresponding to the information provision request is selectively stored in the information requesting device 200. Therefore, it is possible to prevent system resources of the information requesting device 200 from being excessive wasted.

The packet reception unit 220 may be configured to extract the packet structure information from the communication packet.

Specifically, the packet reception unit 220 may check the packet identification information stored in the received communication packet, and extract the packet structure information only when the received communication packet is a communication packet corresponding to the transmitted information provision request.

Preferably, the packet reception unit 220 may extract the packet structure information from the communication packet before allocating a buffer to the reception buffer unit 210.

Also, the packet reception unit 220 may be configured to determine the packet structure of the communication packet as the first packet structure or the second packet structure based on the extracted packet structure information.

For example, when the packet structure of the communication packet is the first packet structure, the communication packet may include identification information indicating the first packet structure as the packet structure information. Conversely, when the packet structure of the communication packet is the second packet structure, the communication packet may include identification information indicating the second packet structure as the packet structure information. Accordingly, the packet reception unit 220 may determine the packet structure of the received communication packet as the first packet structure or the second packet structure by checking the packet structure information extracted from the communication packet.

Also, the packet reception unit 220 may be configured to allocate the buffer to the reception buffer unit 210 in a size preset to correspond to the determined packet structure.

Specifically, the size of the buffer preset to correspond to the first packet structure and the size of the buffer preset to correspond to the second packet structure may be different.

For example, the size of the buffer preset to correspond to the first packet structure may be 8 bytes, and the size of the buffer preset to correspond to the second packet structure may be 64 bytes. After determining the packet structure of the received communication packet, the packet reception unit 220 may allocate a buffer having a size corresponding to the packet structure of the communication packet to the reception buffer unit 210 by setting a register value related to the buffer.

In addition, the packet reception unit 220 may allocate a buffer to the reception buffer unit 210 to correspond to the structure of the communication packet, and then store the response data included in the communication packet in the allocated buffer.

That is, according to an embodiment of the present disclosure, the buffer of the reception buffer unit 210 in which the communication packet may be stored may be allocated according to the packet structure of the communication packet. Accordingly, since the buffer of the reception buffer unit 210 is allocated based on the packet structure of the communication packet, it is possible to prevent in advance that the system resources of the reception buffer unit 210 are wasted as the buffer of the reception buffer unit 210 is allocated too much.

Also, the packet reception unit 220 may be configured to further extract the data size information from the communication packet when the determined packet structure is the second packet structure.

Specifically, the packet reception unit 220 may check the packet structure information stored in the received communication packet, and extract the data size information only when the packet structure of the received communication packet is the second packet structure.

Preferably, the packet reception unit 220 may extract the data size information from the communication packet after allocating a buffer to the reception buffer unit 210 first.

Also, the packet reception unit 220 may be configured to adjust the size of the allocated buffer to a size corresponding to the data size based on the extracted data size information.

Specifically, the packet reception unit 220 may first allocate a buffer having a size corresponding to the structure of the communication packet, and then extract the data size information from the communication packet. In addition, the packet reception unit 220 may check the data size of the response data from the extracted data size information, and adjust the size of the buffer allocated to the reception buffer unit 210 to correspond to the checked data size. For example, the packet reception unit 220 may change a buffer-related register value to change the size of the buffer allocated to the reception buffer unit 210 to correspond to the data size.

For example, it is assumed that the packet structure of the communication packet is the second packet structure, the size of the buffer preset to correspond to the second packet structure is 64 bytes, and the data size of the communication packet is 20 bytes. First, the packet reception unit 220 may allocate a buffer having a size of 64 bytes to the reception buffer unit 210 to correspond to the packet structure of the communication packet. In addition, the packet reception unit 220 may change the size of the buffer allocated to the reception buffer unit 210 to 20 bytes in consideration of the data size (20 bytes) of the response data.

In addition, the packet reception unit 220 may store the response data in the buffer allocated to the reception buffer unit 210. That is, after changing the size of the buffer allocated to the reception buffer unit 210, the packet reception unit 220 may store the response data in the buffer having a changed size.

According to an embodiment of the present disclosure, the buffer of the reception buffer unit 210 may be allocated suitable for the packet structure and the data size of the communication packet. Accordingly, since the buffer of the reception buffer unit 210 can be allocated most suitably for the communication packet, the system resources of the reception buffer unit 210 can be efficiently used.

Hereinafter, embodiments of the first packet structure and the second packet structure will be described with reference to FIGS. 5 to 7.

Figure 5:
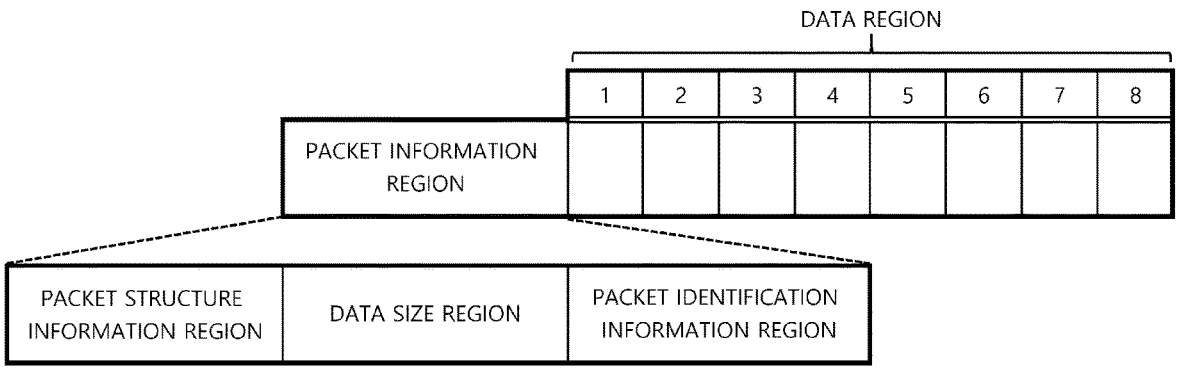
FIG. 5 is a diagram schematically showing a first packet structure used in the communication system according to an embodiment of the present disclosure.

FIG. 5 is a diagram schematically showing a first packet structure used in the communication system 10 according to an embodiment of the present disclosure.

For example, referring to FIG. 5, the first packet structure may be a packet structure for CAN communication. In addition, the first packet structure may include a packet information region and a data region.

Specifically, the packet information region may include a packet structure information region in which the packet structure information of the communication packet may be stored. That is, the identification information indicating the first packet structure may be stored in the packet information region of the first packet structure.

Also, the packet information region may include a data size region in which the data size information of the communication packet may be stored. In addition, the packet information region may include a packet identification information region in which the packet identification information of the communication packet may be included.

For example, the packet reception unit 220 of the information requesting device 200 may extract the packet identification information, the packet structure information and the data size information from the packet information region of the received communication packet.

Also, the response data may be stored in the data region. Preferably, the data size of the response data that can be stored in the first packet structure may be 8 bytes or less.

Figure 6:
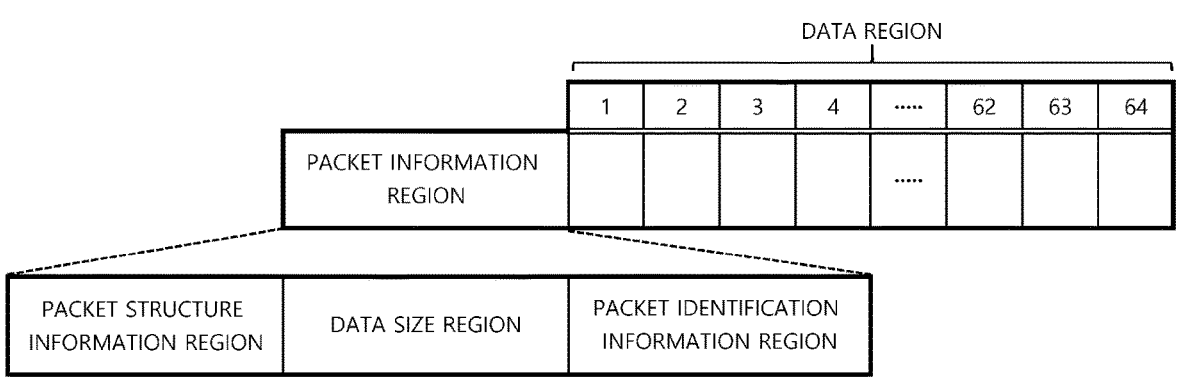
FIG. 6 is a diagram schematically showing a second packet structure used in the communication system according to an embodiment of the present disclosure.

FIG. 6 is a diagram schematically showing a second packet structure used in the communication system 10 according to an embodiment of the present disclosure.

For example, in the embodiment of FIG. 6, the second packet structure may be a packet structure for CAN FD communication. In addition, the second packet structure may include a packet information region and a data region. Here, the packet information region included in the second packet structure may include a packet structure information region, a data size region, and a packet identification information region, like the packet information region included in the first packet structure. However, the packet structure information indicating the second packet structure may be stored in the packet information region of the second packet structure.

Preferably, the data size of the response data that can be stored in the second packet structure may be 64 bytes or less.

For example, referring to FIGS. 5 and 6, when the data size of the response data is 8 bytes or less, the control unit 110 may generate the communication packet according to the first packet structure.

Conversely, when the data size of the response data is greater than or equal to 8 bytes and less than or equal to 64 bytes, the control unit 110 may generate the communication packet according to the second packet structure.

Figure 7:
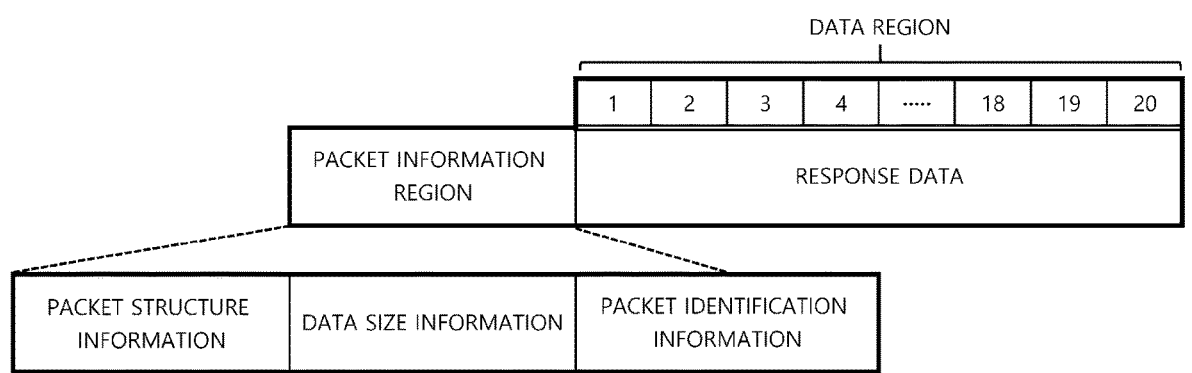
FIG. 7 is a diagram schematically showing an exemplary configuration of a communication packet generated by the communication system according to an embodiment of the present disclosure.

FIG. 7 is a diagram schematically showing an exemplary configuration of a communication packet generated by the communication system 10 according to an embodiment of the present disclosure.

Specifically, FIG. 7 is a diagram schematically showing a communication packet generated when the data size of the response data is 20 bytes. Here, the packet structure of the communication packet may be the second packet structure.

Referring to FIGS. 6 and 7, the data region of the second packet structure may include the response data of a maximum size of 64 bytes, but FIG. 7 is an embodiment in which the data region of the second packet structure includes response data of a size of 20 bytes.

When the packet reception unit 220 of the information requesting device 200 receives the communication packet of FIG. 7, the packet reception unit 220 may extract the packet identification information from the packet information region of the communication packet. Specifically, the packet reception unit 220 may extract the packet identification information from the packet identification information region of the packet information region.

When the extracted packet identification information corresponds to the transmitted information provision request, the packet reception unit 220 may extract the packet structure information from the packet information region of the communication packet. Specifically, the packet reception unit 220 may extract the packet structure information from the packet structure information region of the packet information region.

When the extracted packet structure information is the second packet structure, the packet reception unit 220 may allocate a buffer of a size of 64 bytes to the reception buffer unit 210.

In addition, the packet reception unit 220 may extract the data size information from the packet information region of the communication packet. Specifically, the packet reception unit 220 may extract the data size information from the data size region of the packet information region.

In addition, the packet reception unit 220 may adjust the size of the buffer allocated to the reception buffer unit 210 to correspond to the extracted data size information.

For example, in the embodiment of FIG. 7, the data size of the response data included in the communication packet may be 20 bytes. The packet reception unit 220 may change the size of the buffer allocated to the reception buffer unit 210 from 64 bytes to 20 bytes.

In addition, the packet reception unit 220 may store the response data included in the communication packet in the buffer of the reception buffer unit 210.

Specifically, the packet reception unit 220 may be configured to store the response data included in the communication packet in the buffer whose size is adjusted to correspond to the data size.

In addition, the packet reception unit 220 may be configured to extract the response data stored in the reception buffer unit 210 and transmit the extracted response data to the processor 230.

In addition, the information providing device 100 may be configured to generate a plurality of communication packets based on at least one packet structure among the plurality of packet structures according to the data size of the response data. That is, the plurality of communication packets may be generated based on the same packet structure or may be generated based on different packet structures.

Specifically, after calculating the data size of the response data, the control unit 110 of the information requesting device 200 may compare the calculated data size of the response data with an upper limit data size of the second packet structure.

If the calculated data size of the response data exceeds the upper limit data size of the second packet structure, the control unit 110 may generate a first communication packet including a part of the response data according to the second packet structure.

Conversely, if the calculated data size of the response data is less than the upper limit data size of the second packet structure, the control unit 110 may select any one of the first packet structure and the second packet structure according to the data size of the response data, and further generate a second communication packet according to the selected packet structure.

For example, it is assumed that the data size of the response data corresponding to the data identification information included in the information provision request is 68 bytes and the upper limit data size of the second packet structure is 64 bytes. The control unit 110 may generate a first communication packet according to the second packet structure to include some data corresponding to 64 bytes of the response data. In this case, the data size information stored in the data size region of the first communication packet may be 64 bytes.

Also, the control unit 110 may calculate the size of residual data not included in the first communication packet among the calculated response data. In addition, the control unit 110 may compare the calculated size of the residual data with the upper limit data size of the second packet structure.

If the calculated size of the residual data exceeds the upper limit data size of the second packet structure, the control unit 110 may further generate a second communication packet including a part of the residual data according to the second packet structure.

Conversely, if the calculated size of the residual data is less than the upper limit data size of the second packet structure, the control unit 110 may select any one of the first packet structure and the second packet structure according to the size of the residual data, and further generate a second communication packet according the selected packet structure.

For example, in the above embodiment, it is assumed that the size of the residual data is 4 bytes after the first communication packet in which the data size of the response data included therein is 64 bytes is generated. Since the size (4 byte) of the residual data is smaller than the upper limit data size (64 byte) of the second packet structure, the control unit 110 may compare the size (4 byte) of the residual data with the preset reference value (8 byte). Since the size (4 byte) of the residual data is less than or equal to the preset reference value (8 byte), the control unit 110 may generate the second communication packet according to the first packet structure.

That is, when the communication system 10 according to an embodiment of the present disclosure needs to generate a plurality of communication packets for the response data, the plurality of communication packets are not uniformly generated by using only one packet structure, but the plurality of communication packets may be generated by using a plurality of packet structures different from each other to correspond to the data size of the response data. Accordingly, the communication load of the communication bus B can be reduced in the process of transmitting the plurality of communication packets, and the communication packet can be processed by the information requesting device 200 more quickly and efficiently.

An electric vehicle according to another embodiment of the present disclosure may include the communication system 10 according to an embodiment of the present disclosure.

The communication bus B connected to the information providing device 100 and the information requesting device 200 included in the communication system 10 to enable communication may be a vehicle communication network of the electric vehicle. For example, the communication bus B may be a communication bus B capable of CAN communication and CAN FD communication.

For example, various electronic control units that may be included in an electric vehicle may be applied to the information providing device 100. If the information providing device 100 is a BMS, the information providing device 100 may provide battery information about the battery and diagnosis information about the battery. If the information providing device 100 is an ACU (Airbag Control Unit), the information providing device 100 may provide diagnosis information for an airbag.

Since the electric vehicle according to another embodiment of the present disclosure may perform communication between electronic control units using the communication system 10, the load on the vehicle communication network can be reduced. In addition, system resources of electronic control units corresponding to the information requesting device 200 can be efficiently utilized without being wasted unnecessary.

Figure 8:
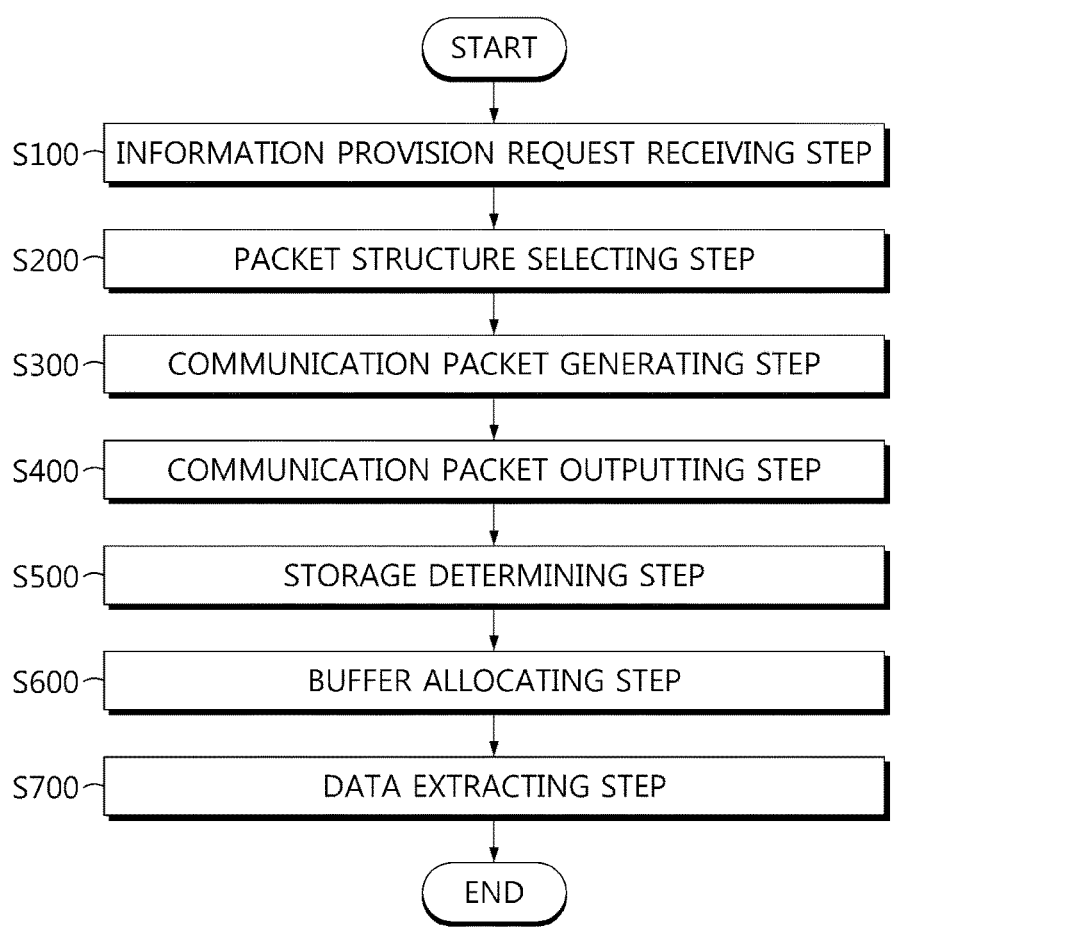
FIG. 8 is a diagram schematically showing a communication method according to another embodiment of the present disclosure.

FIG. 8 is a diagram schematically showing a communication method according to another embodiment of the present disclosure.

The communication method according to another embodiment of the present disclosure may be performed by the communication system 10 according to an embodiment of the present disclosure. Hereinafter, for convenience of description, it is noted that the content overlapping with the previously described content will be briefly described or omitted.

Referring to FIG. 8, the communication method according to another embodiment of the present disclosure may include an information provision request receiving step (S100), a packet structure selecting step (S200), a communication packet generating step (S300), a communication packet outputting step (S400), a storage determining step (S500), a buffer allocating step (S600), and a data extracting step (S700).

The information provision request receiving step (S100) is a step of receiving an information provision request including at least one data identification information, and may be performed by the information providing device 100.

The packet structure selecting step (S200) is a step of selecting at least one among a plurality of packet structures according to a data size of at least one response data corresponding to the data identification information, and may be performed by the information providing device 100.

Specifically, the information providing device 100 may extract data identification information included in the received information provision request. In addition, the information providing device 100 may obtain response data corresponding to the extracted data identification information and calculate a data size of the obtained response data. In addition, the information providing device 100 may select any one among the plurality of packet structures based on the calculated data size of the response data.

Preferably, the information providing device 100 may select a packet structure in consideration of the calculated data size of the response data.

For example, the plurality of packet structures may include the first packet structure of FIG. 5 and the second packet structure of FIG. 6.

The communication packet generating step (S300) is a step of generating a communication packet including packet information and the response data by using the selected packet structure, and may be performed by the information providing device 100.

The information providing device 100 may generate a communication packet by storing the packet information and the response data in the selected packet structure. Here, the packet information may include at least one of packet identification information, packet structure information, and data size information.

The communication packet outputting step (S400) is a step of outputting the generated communication packet to the communication bus B, and may be performed by the information providing device 100.

The information providing device 100 may be connected to communicate with the communication bus B, and output the generated communication packet to the communication bus B.

The storage determining step S500 is a step of determining whether or not to store the communication packet based on the packet identification information included in the communication packet, and may be performed by the information requesting device 200.

Specifically, the information requesting device 200 may receive the communication packet output to the communication bus B. In addition, the information requesting device 200 may extract the packet identification information from the packet information region of the communication packet. In addition, the information requesting device 200 may determine whether the extracted packet identification information corresponds to the transmitted information provision request.

The buffer allocating step (S600) is a step of allocating a buffer corresponding to the communication packet based on the packet information included in the communication packet when it is determined to store the communication packet, and may be performed by the information requesting device 200.

Specifically, the information requesting device 200 may allocate a buffer corresponding to the communication packet based on at least one of the packet structure information and the data size information.

In addition, the buffer allocating step (S600) may be performed only when the packet identification information included in the communication packet corresponds to the information provision request.

After receiving the communication packet, the information requesting device 200 may extract the packet structure information and/or the data size information from the packet information region of the communication packet. In addition, the storage request device may allocate a buffer for storing the communication packet based on the extracted packet structure information and/or the extracted data size information.

Preferably, the information requesting device 200 may allocate a buffer for storing the response data included in the communication packet.

The data extracting step (S700) is a step of storing the response data included in the communication packet in the allocated buffer and extracting the response data from the buffer, and may be performed by the information requesting device 200.

Specifically, the information requesting device 200 may first store the response data included in the communication packet in the allocated buffer, and extract the response data from the buffer.

After the information requesting device 200 extracts the response data from the buffer, the communication between the information requesting device 200 and the information providing device 100 may be terminated.

The present disclosure described above may not be implemented only through limited embodiments, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: communication system
100: information providing device
110: control unit
120: transmission buffer unit
130: packet transmission unit
140: measurement unit
200: information requesting device
210: reception buffer unit
220: packet reception unit
230: processor

What is claimed is:
1. A communication system comprising:
a first device; and
a second device communicatively connected to the first device using a communication bus,

21 wherein the first device is configured to:

receive an information provision request including at least one data identification information from the second device, select one of a plurality of packet structures according to a data size of at least one response data corresponding to the data identification information, wherein each packet structure of the plurality of packet structures is configured to include both packet information in a packet information region and the response data in a data region, and wherein the packet information regions of different packet structures of the plurality of packet structures have different frame formats, generate a communication packet including the packet information and the response data using the selected packet structure and according to the frame format of the selected packet structure, wherein the packet information of the communication packet includes packet structure information identifying the selected packet structure, wherein the plurality of packet structures are associated with different respective packet structure information, and output the generated communication packet to the communication bus, and wherein the second device is configured to:

receive the communication packet from the communication bus, extract the packet structure information from the communication packet, determine the selected packet structure of the communication packet based on the extracted packet structure information, determine whether or not to store the communication packet based on the packet information included in the communication packet, and in response to a determination to store the communication packet, allocate a buffer corresponding to the communication packet in a size preset to correspond to the determined packet structure based on the packet information, store the response data included in the communication packet in the allocated buffer, and extract the response data from the buffer.

2. The communication system according to claim 1, wherein the packet information is configured to further include at least one of packet identification information and data size information.

3. The communication system according to claim 2, wherein the second device is configured to determine whether or not to store the communication packet based on the packet identification information included in the communication packet.

4. The communication system according to claim 2, wherein the second device is configured to allocate the buffer corresponding to the communication packet based on at least one of the packet structure information and the data size information.

5. The communication system according to claim 2, wherein the first device includes:

a control unit configured to calculate the data size of the at least one response data, compare the calculated data size with a preset reference value, select either one of a first packet structure or a second packet structure based on the comparison, and generate the communication packet based on the selected packet structure;

22 a transmission buffer configured to store the communication packet generated by the control unit; and a packet transmitter configured to output the communication packet stored in the transmission buffer to the communication bus.

6. The communication system according to claim 5, wherein the control unit is configured to:

select the first packet structure in response to the calculated data size being equal to or less than the preset reference value, and select the second packet structure in response to the calculated data size exceeding the preset reference value.

7. The communication system according to claim 5, wherein the control unit is configured to generate the packet identification information to correspond to the data identification information of the information provision request, generate the packet structure information to correspond to the selected packet structure, generate the data size information to correspond to the calculated data size, and store the packet identification information, the packet structure information and the data size information in a predetermined region of the selected packet structure.

8. The communication system according to claim 7, wherein the second device includes:

a reception buffer in which the response data included in the communication packet is stored;

a packet receiver configured to receive the communication packet through the communication bus, extract the packet identification information from the received communication packet, store the response data included in the communication packet in the reception buffer in response to the extracted packet identification information corresponding to the information provision request, and extract the response data from the reception buffer; and a processor configured to receive the extracted response data from the packet receiver.

9. The communication system according to claim 8, wherein the packet receiver is configured to further extract the data size information from the communication packet in response to the determined packet structure being the second packet structure, and adjust the size of the allocated buffer to correspond to the data size of the response data based on the extracted data size information.

10. The communication system according to claim 9, wherein the packet receiver is configured to store the response data included in the communication packet in the buffer after adjustment of the size of the allocated buffer to correspond to the data size of the response data and transmit the response data extracted from the reception buffer to the processor.

11. The communication system according to claim 1, wherein the first device is configured to generate a plurality of communication packets based on at least one packet structure among the plurality of packet structures according to the data size of the response data.

12. An electric vehicle, comprising the communication system according to claim 1.

13. The communication system according to claim 1, wherein the plurality of packet structures includes a first packet structure for Controller Area Network (CAN) communication and a second packet structure for Controller Area Network Flexible Data-Rate (CAN FD) communication.

14. A communication system comprising:

a first device; and a second device communicatively connected to the first device using a communication bus, wherein the first device is configured to:

receive an information provision request including at least one data identification information from the second device, select one of a plurality of packet structures according to a data size of at least one response data corresponding to the data identification information, wherein each packet structure of the plurality of packet structures is configured to include both packet information in a packet information region and the response data in a data region, and wherein the packet information regions of different packet structures of the plurality of packet structures have different frame formats, generate a communication packet including the packet information and the response data using the selected packet structure and according to the frame format of the selected packet structure, wherein the packet information of the communication packet includes packet structure information identifying the selected packet structure, wherein the plurality of packet structures are associated with different respective packet structure information, and output the generated communication packet to the communication bus, and wherein the second device is configured to:

receive the communication packet from the communication bus, extract the packet structure information from the communication packet, determine the selected packet structure of the communication packet based on the extracted packet structure information, determine whether or not to store the communication packet based on the packet information included in the communication packet, and in response to a determination to store the communication packet, allocate a buffer corresponding to the communication packet based on the packet information, store the response data included in the communication packet in the allocated buffer, and extract the response data from the buffer, wherein the first device includes a sensor connected to at least one battery and configured to measure battery information including at least one of voltage, current and temperature of the connected battery, and a control unit is configured to receive the battery information from the sensor and generate the at least one response data corresponding to the data identification information based on the received battery information.

15. A communication method, comprising:

receiving, by first device, an information provision request including at least one data identification information;

selecting, by the first device, one of a plurality of packet structures according to a data size of at least one response data corresponding to the data identification information, wherein each packet structure of the plurality of packet structures is configured to include both packet information in a packet information region and the response data in a data region, and wherein the packet information regions of different packet structures of the plurality of packet structures have different frame formats;

generating, by the first device, a communication packet including the packet information and the response data using the selected packet structure and according to the frame format of the selected packet structure, wherein the packet information of the communication packet includes packet structure information identifying the selected packet structure, wherein the plurality of packet structures are associated with different packet structure information;

outputting, by the first device, the generated communication packet to a communication bus;

receiving, by a second device, the communication packet through the communication bus;

determining, by the second device, whether or not to store the communication packet based on the packet information included in the communication packet;

extracting the packet structure information from the communication packet;

determining the selected packet structure of the communication packet based on the extracted packet structure information;

in response to determining to store the communication packet, allocating, by the second device, a buffer corresponding to the communication packet in a size preset to correspond to the determined packet structure based on the packet information;

storing, by the second device, the response data included in the communication packet in the allocated buffer; and extracting, by the second device, the response data from the buffer.

16. A first device comprising:

a processor configured to:

transmit an information provision request to a second device over a communication bus, the information provision request including at least one data identification information from the first device, the data identification information corresponding to a data size;

in response to transmission of the information provision request, receive a communication packet from the second device over the communication bus, the communication packet including packet information and response data, the packet information including packet structure information identifying a selected packet structure of the communication packet, the response data having the data size corresponding to the data identification information of the information provision request;

extract the packet structure information from the communication packet;

determine a selected packet structure of the communication packet based on the extracted packet structure information, wherein the selected packet structure is selected from among a plurality a packet structures associated with different respective packet structure information, wherein each packet structure of the plurality of packet structures is configured to include both the packet information in a packet information region and the response data in a data region, and wherein the packet information regions of different packet structures of the plurality of packet structures have different frame formats;

determine whether or not to store the communication packet based on the packet information included in the communication packet;

in response to a determination to store the communication packet, 5 allocate a buffer corresponding to the communication packet in a size preset to correspond to the determined packet structure based on the packet information, store the response data included in the communication packet in the allocated buffer, and 10 extract the response data from the buffer.

* * * * *